United States Patent
Yu

(10) Patent No.: US 9,461,907 B2
(45) Date of Patent: Oct. 4, 2016

(54) DATA ROUTING

(75) Inventor: Yifan Yu, Beijing (CN)

(73) Assignee: ORANGE, Paris (FR)

( * ) Notice: Subject to any disclaimer, the term of this patent is extended or adjusted under 35 U.S.C. 154(b) by 174 days.

(21) Appl. No.: 14/130,241

(22) PCT Filed: Jun. 27, 2012

(86) PCT No.: PCT/IB2012/001474
§ 371 (c)(1),
(2), (4) Date: Dec. 30, 2013

(87) PCT Pub. No.: WO2013/001360
PCT Pub. Date: Jan. 3, 2013

(65) Prior Publication Data
US 2014/0129736 A1    May 8, 2014

(30) Foreign Application Priority Data

Jun. 30, 2011  (CN) ................ PCT/CN2011/076720

(51) Int. Cl.
*G06F 15/173* (2006.01)
*H04L 12/755* (2013.01)
*H04L 12/751* (2013.01)
*H04L 12/745* (2013.01)
*H04L 29/08* (2006.01)

(52) U.S. Cl.
CPC ............ *H04L 45/021* (2013.01); *H04L 45/08* (2013.01); *H04L 45/748* (2013.01); *H04L 67/327* (2013.01)

(58) Field of Classification Search
CPC ... H04L 45/021; H04L 45/08; H04L 45/748; H04L 67/327
USPC ............. 709/242, 201–205, 219; 707/797; 719/313
See application file for complete search history.

(56) References Cited

U.S. PATENT DOCUMENTS

| | | | | |
|---|---|---|---|---|
| 7,680,884 B2* | 3/2010 | Zhou | ............... | H04L 12/185 370/395.31 |
| 8,644,211 B2* | 2/2014 | Jacobson | ............... | H04L 12/10 370/318 |
| 8,756,297 B2* | 6/2014 | Jacobson | ............... | H04L 61/1582 709/219 |

(Continued)

FOREIGN PATENT DOCUMENTS

EP       2214357 A1    8/2010

OTHER PUBLICATIONS

International Search Report and Written Opinion dated Nov. 20, 2012 for corresponding International Application No. PCT/IB2012/001474, filed Jun. 27, 2012.

*Primary Examiner* — Thu Ha Nguyen
(74) *Attorney, Agent, or Firm* — David D. Brush; Westman Champlin & Koehler, P.A.

(57) ABSTRACT

A routing device includes a routing table. The routing table has a set of entries, each entry including: a content name attribute containing a content name value identifying a content, a faces attribute containing a faces value identifying a set of devices storing data related to the content name value, and a mask type attribute containing a mask type value identifying a type of mask to be used for performing a routing table lookup. The routing device is configured to perform a routing table lookup, the routing table lookup including the use of the mask type value of an entry to determine a covering relation between the content name value of the said entry and a content name value to be searched. The routing device is further configured to update the routing table depending on the determined covering relation.

15 Claims, 5 Drawing Sheets

(56) References Cited

U.S. PATENT DOCUMENTS

| | | | | |
|---|---|---|---|---|
| 8,972,453 B2* | 3/2015 | Wu | ............. | G06F 17/30091 707/758 |
| 2004/0215707 A1* | 10/2004 | Fujita | ............. | H04L 29/06 709/201 |
| 2004/0221296 A1* | 11/2004 | Ogielski | ............. | H04L 12/24 719/313 |
| 2007/0112627 A1* | 5/2007 | Jacobs | ............. | G06Q 10/107 705/14.46 |
| 2008/0028445 A1* | 1/2008 | Dubuc | ............. | H04L 63/08 726/5 |
| 2008/0140618 A1* | 6/2008 | Kumar | ............. | H04L 61/1505 |
| 2009/0285209 A1 | 11/2009 | Stewart et al. | | |
| 2009/0287835 A1 | 11/2009 | Jacobson | | |
| 2009/0288163 A1 | 11/2009 | Jacobson et al. | | |
| 2010/0195655 A1* | 8/2010 | Jacobson | ............. | H04L 45/748 370/392 |
| 2011/0191303 A1* | 8/2011 | Kaufman | ............. | G06F 17/30286 707/684 |
| 2012/0290716 A1* | 11/2012 | Ogielski | ............. | H04L 12/24 709/224 |

* cited by examiner

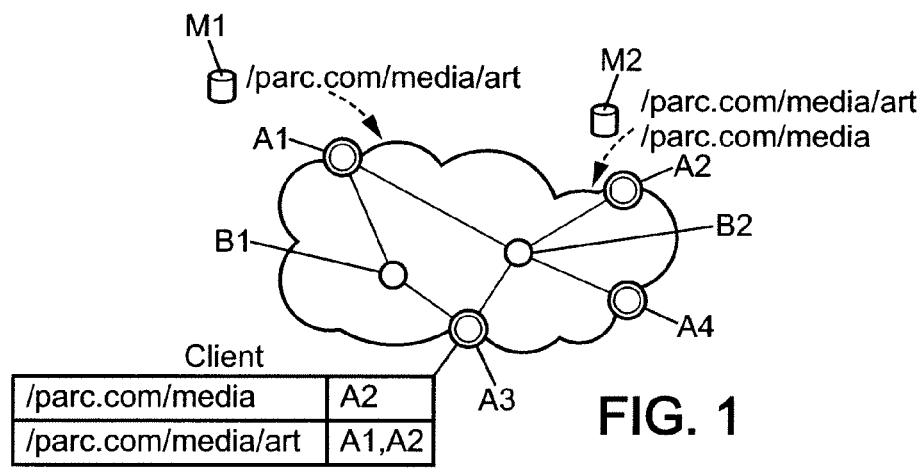
FIG. 1
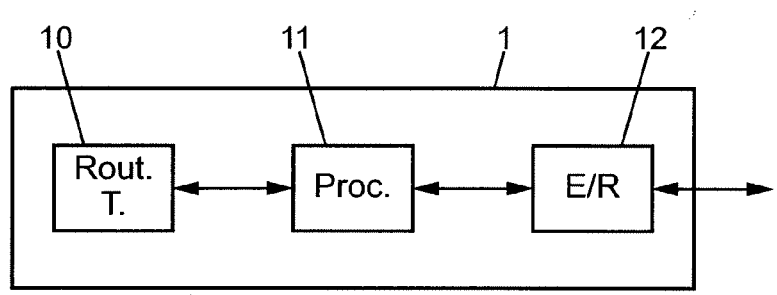
FIG. 2
| Content Name | Mask Type | Faces |
|---|---|---|
| Orange.com | Prefix | 1 |
| news | Postfix | 3 |
| FT.com/news | Prefix | 9 |
FIG. 3

DATA ROUTING

CROSS-REFERENCE TO RELATED APPLICATIONS

This Application is a Section 371 National Stage Application of International Application No. PCT/IB2012/001474, filed Jun. 27, 2012, which is incorporated by reference in its entirety and published as WO 2013/001360 on Jan. 3, 2013, in English.

TECHNICAL FIELD

The present invention relates to data routing, in particular in a Content Centric Network (CCN).

BACKGROUND

The concept of Content Centric Network (CCN) has been proposed by PARC (Palo Alto Research Center) and is considered as a promising candidate architecture for the future Internet.

CCN architectures have been disclosed for instance in documents US20090288163, US20090287835, and US20090285209.

During CCN's operation, each content delivered in the network has a unique structured name. The nodes of the network declare their interest in some content by sending an Interest packet with the name of the wanted content to other nodes of the network. Upon the reception of Interest packet, a CCN node determines whether the content satisfying the interest is available. If so, the corresponding content is sent to the Interest packet owner. Otherwise, the Interest packet is marked as pending in the receiving node and forwarded to a second node in the network based on the interest. After receiving content from the second node in response to the forwarded Interest packet, the node un-marks the Interest packet as pending and sends the content to the Interest packet owner.

A CCN node routes a packet based on the action corresponding to the condition as specified in its routing policy. The longest name match policy is used for determining whether a structured name included in the Interest packet is within the namespace specified in the routing policy.

A CCN node comprises a routing table containing three main data structures: a base called FIB (Forwarding Information Base), a buffer memory called ContentStore, and a table called PIT (Pending Interest Table).

The FIB is used to forward Interest packets toward potential source(s) of matching data. It is similar to an IP (Internet Protocol) FIB except it allows for a list of outgoing faces rather than a single one. The term face is used to represent a node registered in the routing table. The ContentStore is similar as the buffer memory of an IP router. The PIT is used to keep track of Interest packets that have been forwarded upstream toward content source(s) so that returned data can be sent downstream to its requestor(s).

A user device asks for content by broadcasting an Interest packet. A node receiving the Interest packet and having data that satisfies it can respond with a Data packet containing data related to the content. Data packet is transmitted only in response to an Interest packet.

Based on the CCN architecture, PARC proposes a system called VoCCN for facilitating voice calls over CCN, where a CCN user can direct voice calls to another CCN user by expressing an interest.

FIG. 1. represents a network comprising four CCN routers $A_1$ to $A_4$, and two IP routers $B_1$ and $B_2$. A CCN router $A_1$-$A_4$ may create and update its routing table as explained below.

When a media repository $M_1$ next to router $A_1$ is announcing that it can serve Interests matching the prefix '/parc.com/media/art', the router $A_1$ hears this announcement and, in response, installs a local CCN FIB entry for the prefix '/parc.com/media/art' pointing at the face $M_1$ where it heard the announcement. Then, router $A_1$ packages the prefix '/parc.com/media/art' into IGP LSA which is flooded to all nodes of the network.

Router $A_3$ receives the LSA and adds in its routing table FIB a prefix entry for '/parc.com/media/art' pointing to the face $A_1$, as represented in FIG. 1.

Then, when a repository $M_2$ adjacent to router $A_2$ announces prefixes '/parc.com/media' and '/parc.com/media/art', router $A_2$ floods an IGP LSA for these two prefixes.

When receiving the LSA from router $A_2$, the FIB of router $A_3$ is updated to contain /parc.com/media' pointing at face $A_2$, and '/parc.com/media/art' pointing to faces $A_1$ and $A_2$, as represented in FIG. 1.

Then, if a user device adjacent to router $A_3$ expresses interest in index /parc.com/media/art/impressionisthistory.mp4, this interest will get forwarded to both routers $A_1$ and $A_2$, and routers $A_1$ and $A_2$ will each forward it to their adjacent repository $M_1$, $M_2$.

A CCN router generally updates its routing table by creating one routing entry in the PIT for each received Interest packet, and one routing entry in the FIB for each received Link-State Advertisement (LSA). As a consequence, there is sharp growth in the size of routing table, because the routing table has to contain a large number of routing entries. Hence, the CCN approach has to face the challenge of scalability in a practical system.

The invention will improve the situation.

SUMMARY

To address these needs, a first aspect of the present invention relates to a routing device comprising a routing table, the routing table comprising a set of entries, each entry comprising:

a content name attribute containing a content name value identifying a content, a faces attribute containing a faces value identifying a set of devices storing data related to the content name value, and, a mask type attribute containing a mask type value identifying a type of mask to be used for performing a routing table lookup, the routing device being configured to perform a routing table lookup, the routing table lookup comprising the use of the mask type value of an entry to determine a covering relation between the content name value of the said entry and a content name value to be searched, the routing device being further configured to update the routing table depending on the determined covering relation.

This routing device thus takes into account the relevance between identifiers having different length, which permits to avoid redundancy in the routing tables. The routing table size may thus be reduced.

The content name value to be search may be included in a received message, the routing device being further configured to forward the received message depending on the determined covering relation.

The mask type value may be a first mask type value, called prefix, or a second mask type value, called postfix, the first mask type value indicating that a masking have to start at the first byte of a content name value, the second mask type value indicating that a masking have to start at the last byte of a content name value.

The routing device may further be configured to determine, as a covering relation, that a content name value of a routing entry is covered by a content name value to be searched, when the content name value to be searched is equal to an abstracted content name value of the routing entry, the abstracted content name value being determine by masking the content name value of the routing entry according to the mask type value of the said routing entry.

The routing device may further be configured to determine, as a covering relation, that a content name value to be searched is covered by a content name value of a routing entry, when the content name value of the routing entry is equal to an abstracted content name value to be searched, the abstracted content name value being determine by masking the content name value to be searched according to the mask type value of the routing entry.

The routing device may further be configured to determine, as a covering relation, that a content name value to be searched is equal to a content name value of a routing entry, when the content name value of the routing entry is determine as covered by the content name value to be searched, and the content name value to be searched is determined as covered by the content name value of a routing entry.

The routing table may comprise a first data structure, called FIB, used to forward an Interest packet, and a second data structure, called PIT, used to keep track of an Interest packet that has been forwarded, each entry of each data structure comprising a content name attribute, a faces attribute, and a mask type attribute.

A second aspect of the present invention relates to a CCN-based network comprising a set of routing devices according to the first aspect and a set of IP routers, the routing devices being configured to exchange Link-State Advertisement (LSA) messages, a LSA including a mask type attribute, containing a mask type value identifying a type of mask to be used for performing a routing table lookup.

A third aspect of the present invention relates to a method for routing data at a routing device comprising a routing table, the routing table comprising a set of entries, each entry comprising:
a content name attribute containing a content name value identifying a content,
a faces attribute containing a faces value identifying a set of devices storing data related to the content name value, and,
a mask type attribute containing a mask type value identifying a type of mask to be used for performing a routing table lookup,
the method comprising a step of performing a routing table (10) lookup, the routing table lookup comprising an operation of using the mask type value of an entry to determine a covering relation between the content name value of the said entry and a content name value to be searched,
the method further comprising a step of updating the routing table depending on the determined covering relation.

The method may comprise a step of receiving a message, the content name value to be search being included in the received message, the method further comprising a step of forwarding the received message depending on the determined covering relation.

The mask type value may be a first mask type value, called prefix, or a second mask type value, called postfix, the first mask type value indicating that a masking have to start at the first byte of a content name value, the second mask type value indicating that a masking have to start at the last byte of a content name value.

The method may comprise a step of determining, as a covering relation, that a content name value of a routing entry is covered by a content name value to be searched, when the content name value to be searched is equal to an abstracted content name value of the routing entry, the abstracted content name value being determine by masking the content name value of the routing entry according to the mask type value of the said routing entry.

The method may comprise a step of determining, as a covering relation, that a content name value to be searched is covered by a content name value of a routing entry, when the content name value of the routing entry is equal to an abstracted content name value to be searched, the abstracted content name value being determine by masking the content name value to be searched according to the mask type value of the routing entry.

The method may comprise a step of determining, as a covering relation, that a content name value to be searched is equal to a content name value of a routing entry, when the content name value of the routing entry is determine as covered by the content name value to be searched, and the content name value to be searched is determined as covered by the content name value of a routing entry.

A fourth aspect of the present invention relates to a computer program product comprising a computer readable medium, having thereon a computer program comprising program instructions, the computer program being loadable into a data-processing unit and adapted to cause the data-processing unit to carry out the steps of method according to the third aspect when the computer program is run by the data-processing unit.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1 is a schematic block diagram of a CNN-based network according to prior art;

FIG. 2 is a schematic block diagram of a CNN router according to some embodiments of the invention;

FIG. 3 is a table which shows an example of Forwarding Information Base stored in the routing table of the router;

DESCRIPTION OF EMBODIMENTS

Figure 4:
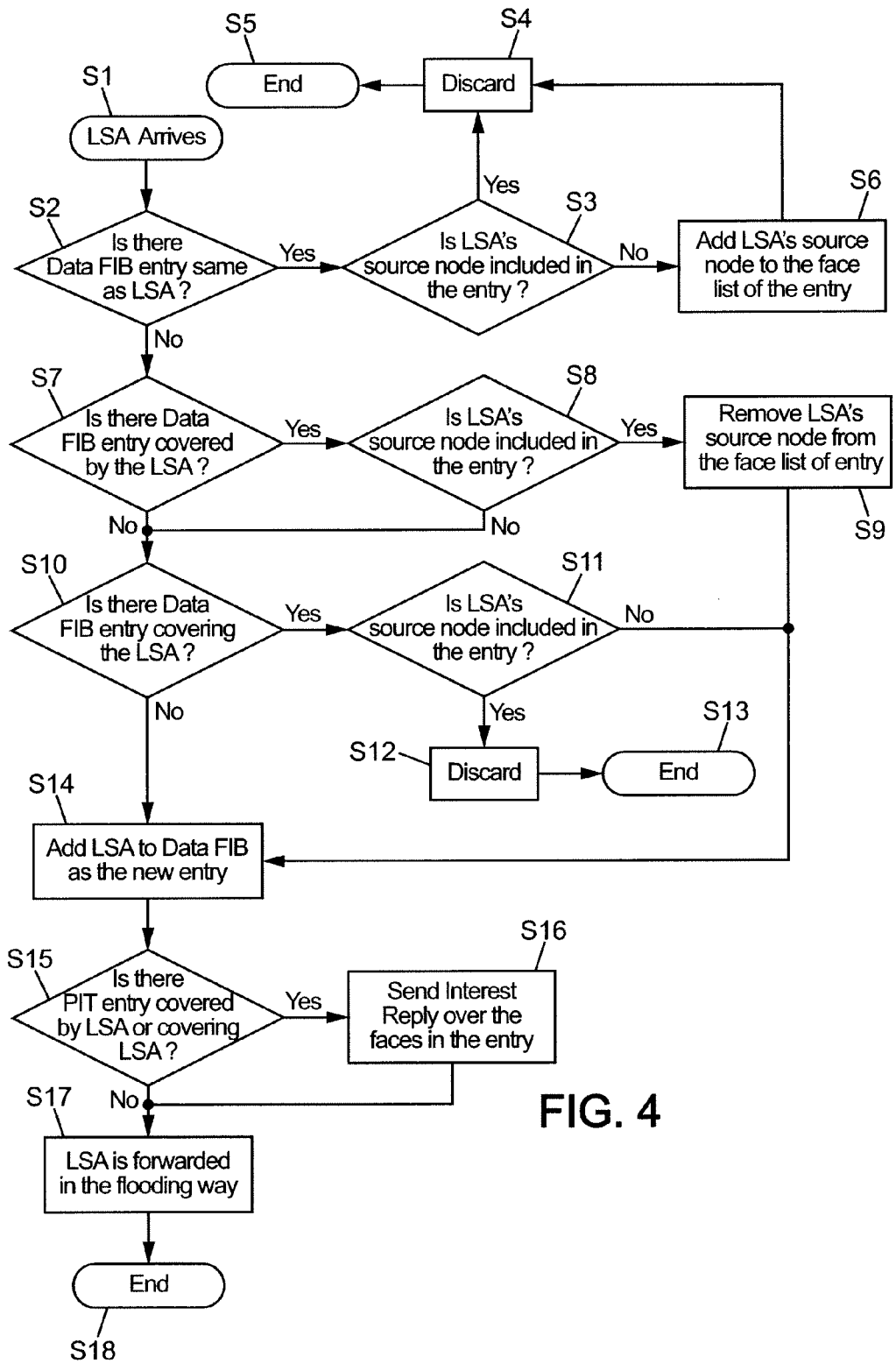
FIG. 4 is a flow chart showing method steps for processing a received LSA according to some embodiments of the invention.

Embodiments of the invention deal with the problem of reducing a routing table size in a Content Centric Network (CCN) or CCN-based network. Embodiments of the invention further deal with the problem of improving the routing of data in a CCN by reducing the number of transmitted controlling packets.

The CCN-based network comprises nodes including a set of CCN routers and a set of IP routers.

The nodes are configured to exchange Link-State Advertisement (LSA) messages to declare the ownership of some content. A LSA includes, in addition to the attributes currently defined in CCN LSA, a mask type attribute. The mask type attribute contains a mask type value identifying a type of mask to be used for a routing table lookup. The mask type is used to obtained an abstracted content name value from a content name value, as described below.

FIG. 2 represents a CNN router 1 comprising a routing table 10, configured to store routing data, a processing block 11, configured to process data, and a transmission-reception block 12, configured to receive and to transmit data.

The routing table 10 comprises three data structures: a base called FIB (Forwarding Information Base), a buffer memory called ContentStore, and a table called PIT (Pending Interest Table).

The router 1 is configured to use the FIB to forward Interest packets toward potential source(s) of matching data. For example, FIG. 3 represents three entries of an FIB. Each FIB entry comprises three attributes: content name, mask type and faces.

The content name attribute of an entry contains a content name value identifying a content.

The mask type attribute contains a mask type value identifying a type of mask to be used for a routing table lookup. The mask type is used to abstract a segment of a content name value contained, for example, in a LSA. According to some embodiments of the invention, two types of mask are used: prefix and postfix. The prefix type indicates that the starting position for masking in the content name string is the first byte of the content name. The postfix type indicates that the masking should start at the last byte of the content name string. How many bytes should be abstracted from the content name string depends on the length of the content name contained in the checked routing entry. For instance, with a prefix mask type and a content name's length of 10, the content name string "Orange.com/news/" is abstracted as "Orange.com". With a postfix mask type and a content name's length of 4, the content name string "Orange.com/news/" is abstracted as "news".

The mask type attribute of an LSA is similar to the mask type attribute of a FIB entry.

The faces attribute contains a faces value identifying a set of nodes of the network having the content associated to the content name value. The term face is used to represent a node registered in the routing table.

The ContentStore may be similar to the ContentStore used in known CCN routers.

The router 1 is configured to use the PIT to keep track of Interest packets that have been forwarded upstream toward content source(s) so that returned data can be sent downstream to its requestor(s). The PIT may be structured as the FIB, that is to say that a PIT entry comprises the three attributes: content name, mask type and faces.

The processing block 11 of the router 1 is configured to perform a routing table lookup. The routing table lookup is performed by using the mask type value of a routing entry of the routing table 10 to determine whether the entry covers or is covered by a abstracted content name value to be searched.

For instance, we assume that the router has to check whether there is a FIB entry covering the content name value "Orange.com/news/", which is for example contained in a LSA.

The router 1 explores the first FIB entry, having the string "Orange.com" as content name value (in the example of FIG. 2). The router 1 then uses the prefix mask value of the first FIB entry to determine an abstracted content name value from the LSA content name value "Orange.com/news/". The LSA abstracted content name value is "Orange.com". Since the LSA abstracted content name value is the same as the content name value of the first FIB entry, the LSA content name value is determined as being covered by the content name value of the first FIB entry.

Similarly, the content name value "Orange.com/news/" is determined as being covered by the content name value "news" of the second entry.

The third entry is not determined as covering the content name value "Orange.com/news/" because the corresponding abstracted content name value obtained with the prefix mask value is different from the content name value of the FIB entry. Specifically, when the searched content name value "Orange.com/news/" is abstracted with the mask of prefix by 10 bytes which is the length of "FT.com/news/", the abstracted section is "Orange.com", which is different from the name indicated by the third FIB entry.

Thus, the routing table lookup is based on the covering relation between the content name value of a routing entry and the content name value to be searched.

A content name value of a routing entry is determined to be covered by a content name value to be searched when the content name value to be searched is equal to the abstracted content name value of the routing entry. For instance, the content name value "FT.com" associated with a prefix mask type value is determined as covering the content name value of the third FIB entry of FIG. 3. The mask type value used to determine the abstracted content name value may be the mask type value of the said routing entry or a mask type value associated with the content name value to be searched.

In a similar way, a content name value to be searched is determined to be covered by a content name value of a routing entry when the content name value of the routing entry is equal to the abstracted content name value to be searched. The mask type value used to determine the abstracted content name value may be the mask type value of the said routing entry or a mask type value associated with the content name value to be searched.

When a content name value of a routing entry is determined to be covered by and to cover a content name value to be searched, the content name value of the routing entry and the content name value to be searched are determined to be equal.

Figure 5:
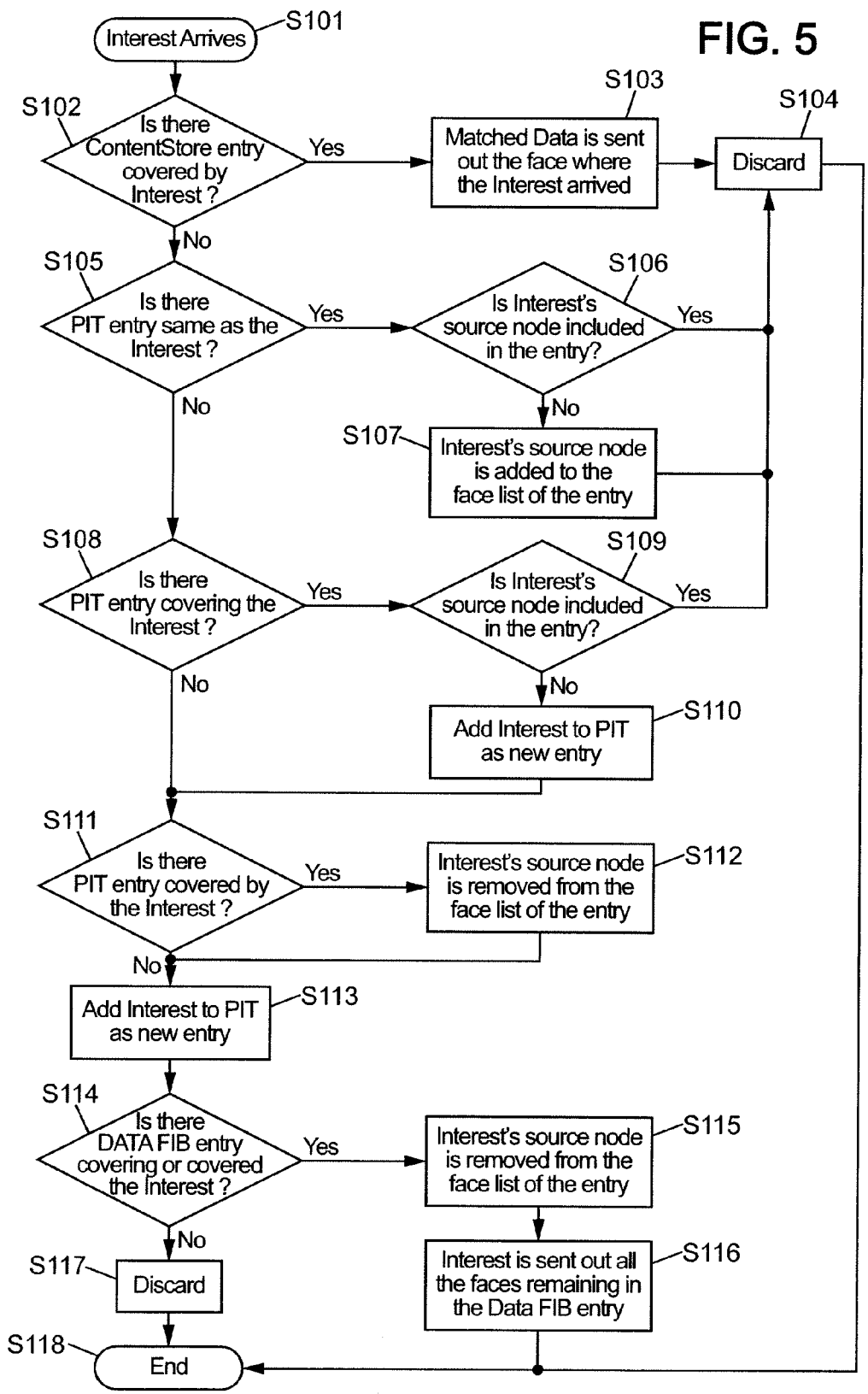
FIG. 5 is a flow chart showing method steps for processing a received Interest packet according to some embodiments of the invention.
Figure 6:
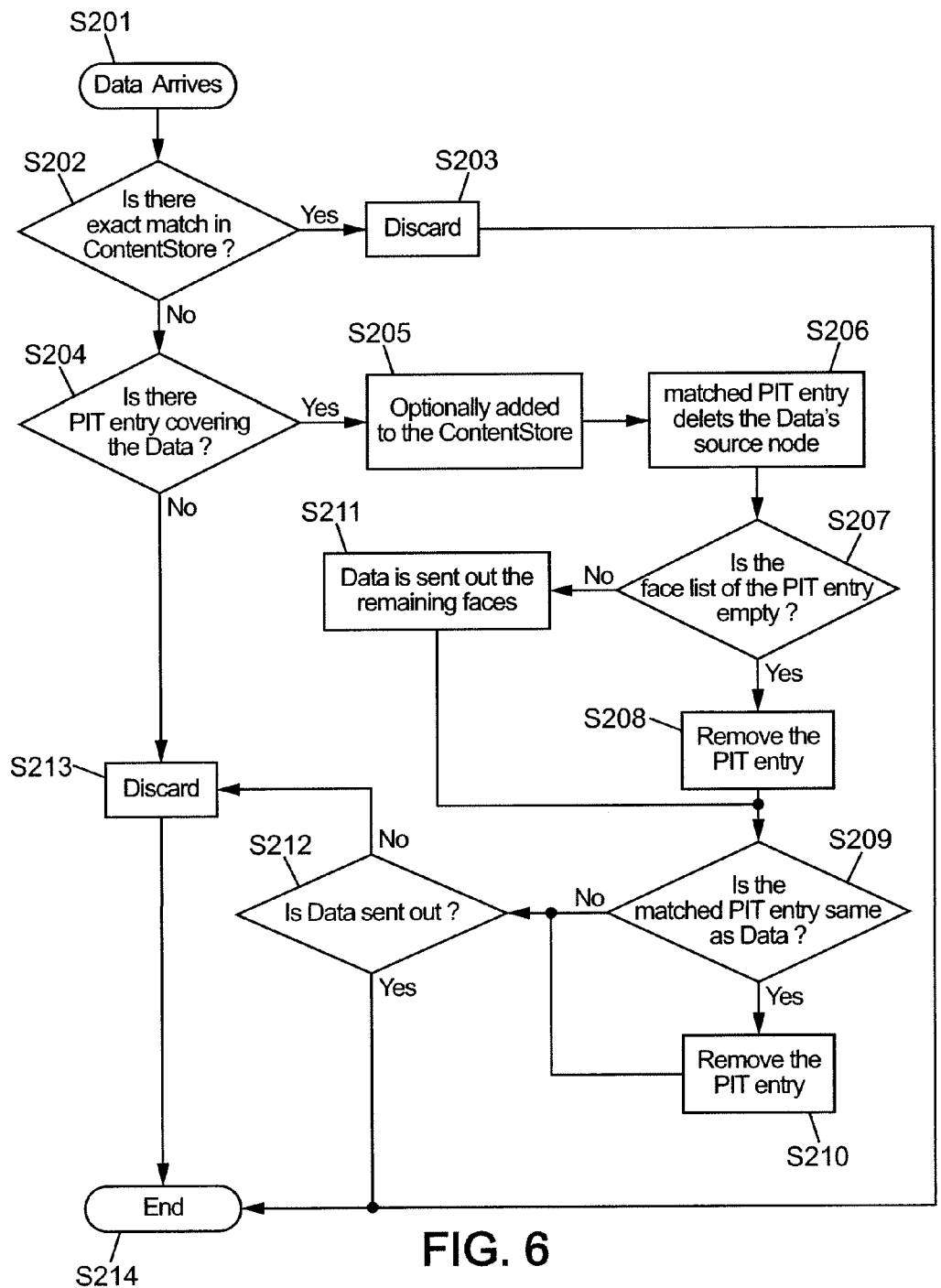
FIG. 6 is a flow chart showing method steps for processing a received content according to some embodiments of the invention.

FIG. 4 to FIG. 6 represent a method for routing data in a CCN-based network, according to embodiments of the invention. The method may be performed by the CCN router 1.

FIG. 4 represents method steps for processing a received LSA.

In step S1, a LSA is received.

In step S2, the router 1 tests whether there is a FIB entry having a content name value equal to the content name value of the LSA. If there is a FIB entry having a content name value equal to the content name value of the LSA, the method goes to step S3. If not, the method goes to step S7.

In step S3, the router 1 tests whether a node identifier contained in the LSA is included in the faces value of the FIB entry determined in step S2. If the node identifier of the LSA is included in the faces value of the FIB entry, the method goes to step S4. If not, the method goes to step S6.

In step S4, the router 1 discards the LSA. Then the method goes to step S5.

In step S5, the method ends.

In step S6, the router 1 modifies the faces value of the FIB entry determined in step S2 to add the node identifier of the LSA. Thus, the router does not add a new entry in the FIB, but only update the corresponding entry. Then, the method goes to step S4.

In step S7, the router 1 tests whether there is a FIB entry having a content name value covered by the content name value of the LSA. Step S7 is performed by using the mask type value, as explained above. If there is a FIB entry having a content name value covered by the content name value of the LSA, the method goes to step S8. If not, the method goes to step S10.

In step S8, the router 1 tests whether a node identifier contained in the LSA is included in the faces value of the FIB entry determined in step S7. If the node identifier of the LSA is included in the faces value of the FIB entry, the method goes to step S9. If not, the method goes to step S10.

In step S9, the router 1 modifies the faces value of the FIB entry determined in step S7 to remove the node identifier of the LSA. Then the method goes to step S14.

In step S10, the router 1 tests whether there is a FIB entry having a content name value covering the content name value of the LSA. If there is a FIB entry having a content name value covering the content name value of the LSA, the method goes to step S11. If not, the method goes to step S14.

In step S11, the router 1 tests whether the node identifier of the LSA is included in the faces value of the FIB entry determined in step S10. If the node identifier of the LSA is included in the faces value of the FIB entry, the method goes to step S12. If not, the method goes to step S9.

In step S12, the router 1 discards the LSA. Then the method goes to step S13.

In step S13, the method ends.

In step S14, the router 1 creates a new entry in the FIB. The new entry has a content name value corresponding to the content name value of the LSA, a mask type value corresponding to the mask type value of the LSA and a faces value corresponding to the node identifier of the LSA. Then the method goes to step S15.

In step S15, the router 1 tests whether there is a PIT entry covered by LSA or covering LSA. If there is PIT entry covered by LSA or covering LSA, the method goes to step S16. If not, the method goes to step S17.

In step S16, the router 1 sends Interest reply to the nodes identified in the faces value of the entry determined in step S15. Then the method goes to step S17.

In step S17, the router 1 forwards the LSA in the network in a flooding way. Then the method goes to step S18.

In step S18, the method ends.

FIG. 5 represents method steps for processing a received Interest packet.

In step S101, the router 1 receives an Interest packet.

In step S102, the router 1 tests whether there is a ContentStore entry having a content name value covered by the content name value of the Interest packet. If there is ContentStore entry having a content name value covered by the content name value of the Interest packet, the method goes to step S103. If not, the method goes to step S105.

In step S103, the router 1 sends the content corresponding to the content name value of the entry determined in step S102 to the node from which the Interest packet has been received. Then the method goes to step S104.

In step S104, the router 1 discards the Interest packet. Then the method goes to step S118.

In step S105, the router 1 tests whether there is PIT entry having a content name value corresponding to the content name value of the Interest packet. If there is PIT entry having a content name value corresponding to the content name value of the Interest packet, the method goes to step S106. If not, the method goes to step S108.

In step S106, the router 1 tests whether Interest source node identifier is included in the faces value of the entry determined in step S105. If Interest source node identifier is included in the faces value, the method goes to step S104. If not, the method goes to step S107.

In step S107, the router 1 updates the entry determined at step S106 to add the Interest source node identifier in the faces value of the entry. Then the method goes to step S104.

In step S108, the router 1 tests whether there is PIT entry having a content name value covering the content name value of the Interest packet. If there is PIT entry having a content name value covering the content name value of the Interest packet, the method goes to step S109. If not, the method goes to step S111.

In step S109, the router 1 tests whether Interest source node identifier is included in the faces value of the entry determined in step S108. If Interest source node identifier is included in the faces value, the method goes to step S104. If not, the method goes to step S110.

In step S110, the router 1 creates a new entry in the PIT. The new entry has a content name value corresponding to the content name value of the Interest packet, a mask type value corresponding to the mask type value of the Interest packet and a faces value corresponding to the node identifier of the Interest packet. Then the method goes to step S111.

In step S111, the router 1 tests whether there is PIT entry having a content name value covered by the content name value of the Interest packet. If there is PIT entry having a content name value covered by the content name value of the Interest packet, the method goes to step S112. If not, the method goes to step S113.

In step S112, the router 1 modifies the faces value of the PIT entry determined in step S111 to remove the node identifier of the Interest packet. Then the method goes to step S113.

In step S113, the router 1 creates a new entry in the PIT. The new entry has a content name value corresponding to the content name value of the Interest packet, a mask type value corresponding to the mask type value of the Interest packet and a faces value corresponding to the node identifier of the Interest packet. Then the method goes to step S114.

In step S114, the router 1 tests whether there is FIB entry having a content name value covering or covered the content name value of the Interest packet. If there is FIB entry having a content name value covering or covered the content name value of the Interest packet, the method goes to step S115. If not, the method goes to step S117.

In step S115, the router 1 modifies the faces value of the PIT entry determined in step S114 to remove the node identifier of the Interest packet. Then the method goes to step S116.

In step S116, the router 1 sends the Interest packet to all the faces remaining in the FIB entry determined in step S114. Then the method goes to step S118.

In step S117, the router 1 discards the Interest packet. Then the method goes to step S118.

In step S118, the method ends.

It has to be noted that the processing of the received Interest packet involves the routing table lookup in ContentStore, PIT and FIB.

FIG. 6 represents method steps for processing a received content.

In step S201, the router 1 receives content data.

In step S202, the router 1 tests whether the received content corresponds to a content identified in the ContentStore. If the received content corresponds to a content identified in an entry of the ContentStore, the method goes to step S203. If not, the method goes to step S204.

In step S203, the router 1 discards the received content. Then the method goes to step S214.

In step S204, the router 1 tests whether there is PIT entry having a content name value covering the received content. If there is PIT entry having a content name value covering the received content, the method goes to step S205. If not, the method goes to step S213.

In step S205, the router 1 optionally adds the received content to the ContentStore. Then the method goes to step S206.

In step S206, the router 1 modifies the faces value of the PIT entry determined in step S204 to remove the node identifier corresponding to the received content. Then the method goes to step S207.

In step S207, the router 1 tests whether the faces value of the PIT entry determined in step S204 corresponds to an empty list of faces. If the faces value of the PIT entry corresponds to an empty list of faces, the method goes to step S208. If not, the method goes to step S211.

In step S208, the router 1 removes the PIT entry determined in step S204. Then the method goes to step S209.

In step S209, the router 1 tests whether the matched PIT entry has a content name value corresponding to the received content. If the matched PIT entry has a content name value corresponding to the received content, the method goes to step S210. If not, the method goes to step S212.

In step S210, the router 1 removes the PIT entry. Then the method goes to step S212.

In step S211, the router 1 sends the received content to the nodes identified in the faces value of the PIT entry. Then the method goes to step S209.

In step S212, the router 1 tests whether the received content has been sent. If the received content has been sent, the method goes to step S214. If not, the method goes to step S213.

In step S213, the router 1 discards the received content. Then the method goes to step S214.

In step S214, the method ends.

Figure 7:
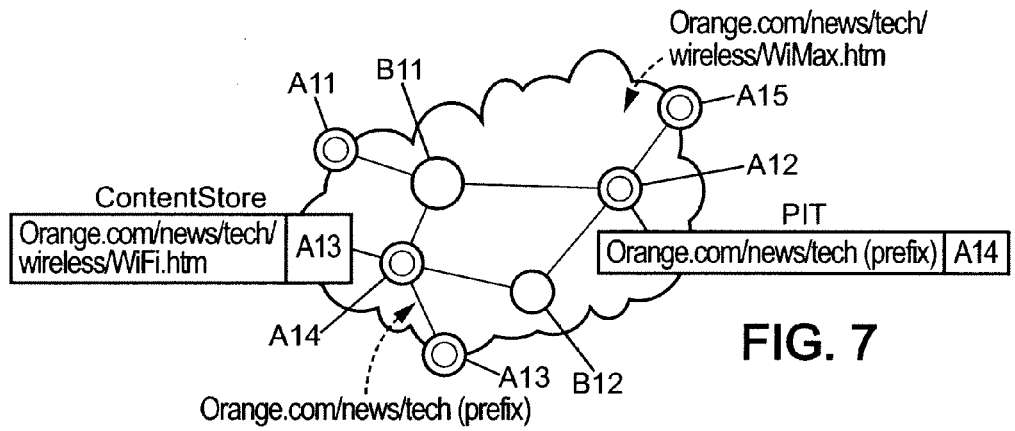
FIG. 7-9 are schematic block diagrams of CNN-based networks according to some embodiments of the invention.

FIG. 7 represents an example of forwarding data in a CCN network using the routing method described above. The CCN network comprises five CCN routers $A_{11}$ to $A_{15}$ and two IP routers $B_{11}$ and $B_{12}$. Each CCN routers $A_{11}$ to $A_{15}$ is for instance similar to router 1.

We assume that the router $A_{13}$ sends to its CCN neighbor router $A_{14}$ an Interest packet containing the content name value "Orange.com/news/tech" and a prefix mask type value. Upon the reception of the Interest packet, the router $A_{14}$ looks up its routing table and finds a ContentStore entry having "Orange.com/news/tech/wireless/WiFi.htm" as content name value. The entry is then determined as covered by the content name value of the Interest packet. Then, the router $A_{14}$ forwards the corresponding data to router $A_{13}$.

We then assume that an Interest packet containing the content name value "Orange.com/news/tech/wireless/WiMax.htm" traverses from router $A_{15}$ to router $A_{12}$. The router $A_{12}$ looks up its routing table and finds a PIT entry having "Orange.com/news/tech" as content name value and a prefix mask type value. The entry is then determined as covering the received content name value. Then, the router $A_{12}$ determines that the faces value of the said entry identifies the router $A_{14}$. Then, the router $A_{12}$ forwards the Interest packet to router $A_{14}$.

Figure 8:
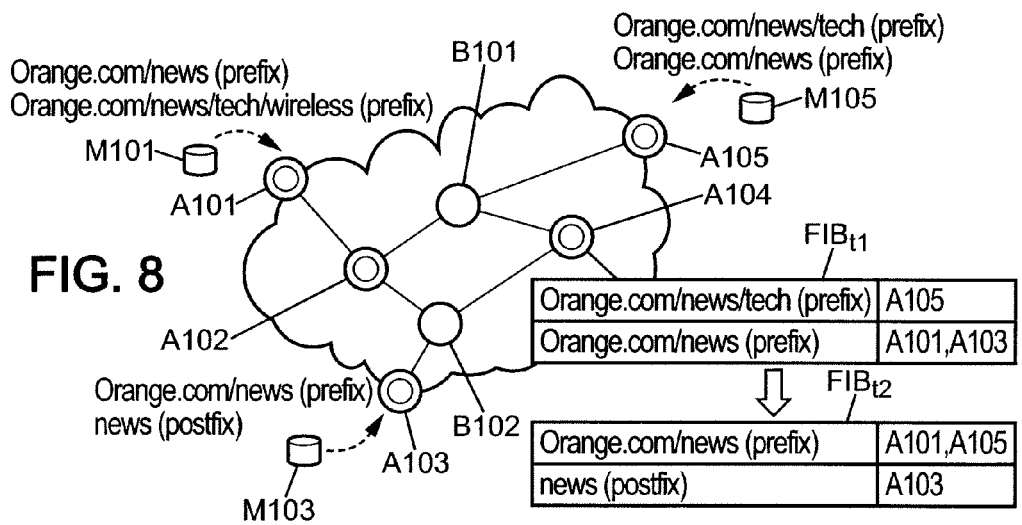

FIG. 8 represents an example of routing table (FIB) update triggered by LSA in a CCN network using the routing method described above. The network comprises five CCN routers $A_{101}$ to $A_{105}$ and two IP routers $B_{101}$ and $B_{102}$. Each CCN routers $A_{101}$ to $A_{105}$ is for instance similar to router 1.

We assume that the three CNN routers $A_{101}$, $A_{103}$ and $A_{105}$ are flooding LSA from media repository $M_{101}$, $M_{103}$ and $M_{105}$, respectively, in the network.

In a first stage, routers $A_{101}$, $A_{103}$ and $A_{105}$ send LSAs containing content name values "Orange.com/news" and "Orange.com/news/tech", respectively, and prefix mask type values. The router $A_{104}$ receives the LSAs and updates its FIB, as symbolized by table $FIB_{t1}$ in FIG. 8.

In a second stage, routers $A_{101}$, $A_{103}$ and $A_{105}$ send additional LSAs containing respectively a content name value "Orange.com/news/tech/wireless" and a prefix mask type value, a content name value "news" and a postfix mask type value, and a content name value "Orange.com/news" and a prefix mask type value.

Then, the router $A_{104}$ updates its FIB as symbolized by table $FIB_{t2}$ in FIG. 8. Since the LSA content name value received from router $A_{101}$ is covered by the content name value of the routing entry created from its previous LSA, the FIB entry pointing to router $A_{101}$ is unchanged. The LSA received from router $A_{103}$ contains a content name value covering the content name value of the routing entry created from its previous LSA. Thus, the FIB entry pointing to router $A_{103}$ is updated to have "news" as content name value and postfix as mask type value. The routing entry pointing to router $A_{105}$ is updated to have "Orange.com/news" as content name value and prefix as mask type value. Moreover, the previous entry having the content name value "Orange.com/news/tech" and a prefix mask type value is removed.

Figure 9:
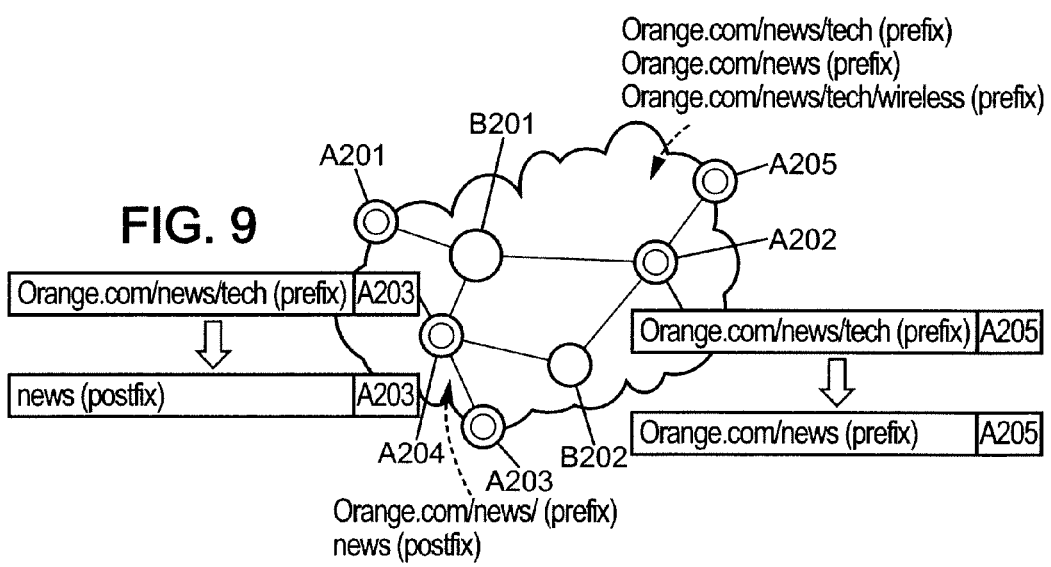

FIG. 9 represents an example of routing table (PIT) update triggered by an Interest packet in a CCN network using the routing method described above. The network comprises five CCN routers $A_{201}$ to $A_{205}$ and two IP routers $B_{201}$ and $B_{202}$. Each CCN routers $A_{201}$ to $A_{205}$ is for instance similar to router 1.

We assume that the two CCN routers $A_{203}$ and $A_{205}$ are sending Interest packets to their neighbor routers $A_{204}$ and $A_{202}$ respectively.

In a first stage, the Interest packet containing the content name value "Orange.com/news/tech" and a prefix mask type value is sent from router $A_{203}$ to router $A_{204}$. The router $A_{204}$ then creates a PIT entry with the content name value "Orange.com/news/tech" and a prefix mask type value.

Meanwhile, an Interest packet with the content name value "Orange.com/news/tech" and a prefix mask type is sent from the router $A_{205}$ to the router $A_{202}$. The router $A_{202}$ then creates a PIT entry with the content name value "Orange.com/news/tech" and a prefix mask type.

In a second stage, the router $A_{203}$ sends an Interest packet with the content name value "news" and a postfix mask type value to the router $A_{204}$. The router $A_{204}$ then updates the PIT. Specifically, the content name value "Orange.com/news/tech" is replaced by "news" and the prefix mask type value is replaced by postfix mask type value. The update is due to the fact that the content name value of the Interest packet covers the existing content name value of the said PIT entry. Similarly, in response to the reception of the Interest packet with content name value "Orange.com/news" and prefix mask type value from router $A_{205}$, the router $A_{202}$ modify the PIT entry with content name value "Orange.com/news/tech" and prefix mask type value to have "Orange.com/news" as content name value and prefix as mask type value.

In a third stage, the router $A_{205}$ sends an Interest packet which the content name value "Orange.com/news/tech/wireless" and a prefix mask type value to router $A_{202}$. Since the content name value in the new Interest packet does not cover the content name value "Orange.com/news", the Interest packet is omitted by router $A_{202}$ and its PIT remains unchanged.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A routing device comprising:
   a computer readable medium comprising a routing table stored thereon, the routing table comprising a set of entries, each entry comprising:
   a content name attribute containing a content name value identifying a content,
   a faces attribute containing a faces value identifying a set of devices storing data related to the content name value, and,
   a mask type attribute containing a mask type value identifying a type of mask to be used for performing a routing table lookup; and
   the routing device being configured to perform a routing table lookup, the routing table lookup comprising determining a covering relation between the content name value of the said entry and a content name value to be searched, said determining a covering relation comprising abstracting the content name value to be searched according to the entry of the routing table, a length of bytes to be abstracted being equal to the length of the content name value in the entry, a starting byte of the abstracting being determined by the mask type value of the entry,
   the routing device being further configured to update the routing table depending on the determined covering relation.

2. The routing device according to claim 1, wherein the content name value to be searched is included in a received message, the routing device being further configured to forward the received message depending on the determined covering relation.

3. The routing device according to claim 1, wherein the mask type value is a first mask type value, called prefix, or a second mask type value, called postfix,
   the first mask type value indicating that the content name value is a prefix and a masking have to start at the first byte of a content name to be searched,
   the second mask type value indicating that the content name value is a postfix and a masking have to start at the last byte of a content name to be searched.

4. The routing device according to claim 3, further configured to determine, as a covering relation, that a content name value of a routing entry is covered by a content name value to be searched, when the content name value to be searched is equal to an abstracted content name value of the routing entry, the abstracted content name value being determined by masking the content name value of the routing entry according to the mask type value of the said routing entry.

5. The routing device according to claim 4, further configured to determine, as a covering relation, that a content name value to be searched is equal to a content name value of a routing entry, when the content name value of the routing entry is determined as covered by the content name value to be searched, and the content name value to be searched is determined as covered by the content name value of a routing entry.

6. The routing device according to claim 3, further configured to determine, as a covering relation, that a content name value to be searched is covered by a content name value of a routing entry, when the content name value of the routing entry is equal to an abstracted content name value to be searched, the abstracted content name value being determined by masking the content name value to be searched according to the mask type value of the routing entry.

7. The routing device according to claim 1, wherein the routing table comprises a first data structure, called FIB, used to forward an Interest packet, and a second data structure, called PIT, used to keep track of an Interest packet that has been forwarded, each entry of each data structure comprising a content name attribute, a faces attribute, and a mask type attribute.

8. A CCN-based network comprising:
   a set of routing devices, each routing device comprising
   a routing table comprising a set of entries, each entry comprising:
   a content name attribute containing a content name value identifying a content,
   a faces attribute containing a faces value identifying a set of devices storing data related to the content name value, and,
   a mask type attribute containing a mask type value identifying a type of mask to be used for performing a routing table lookup;

the routing device being configured to perform a routing table lookup, the routing table lookup comprising determining a covering relation between the content name value of the said entry and a content name value to be searched, said determining a covering relation comprising abstracting the content name value to be searched according to the entry of the routing table, a length of bytes to be abstracted being equal to the length of the content name value in the entry, a starting byte of the abstracting being determined by the mask type value of the entry;

the routing device being further configured to update the routing table depending on the determined covering relation; and a set of IP routers, the routing devices being further configured to exchange Link-State Advertisement (LSA) messages, a LSA including the mask type attribute, containing the mask type value identifying the type of mask to be used for performing the routing table lookup.

9. A method for routing data at a routing device comprising a routing table, the routing table comprising a set of entries, each entry comprising:
a content name attribute containing a content name value identifying a content,
a faces attribute containing a faces value identifying a set of devices storing data related to the content name value, and,
a mask type attribute containing a mask type value identifying a type of mask to be used for performing a routing table lookup, the method comprising:
performing a routing table lookup, the routing table lookup comprising an operation of determining a covering relation between the content name value of the said entry and a content name value to be searched, said determining a covering relation comprising abstracting the content name value to be searched according to the entry of the routing table, a length of bytes to be abstracted being equal to the length of the content name value in the entry, a starting byte of the abstracting being determined by the mask type value of the entry; and
updating the routing table depending on the determined covering relation.

10. The method according to claim 9, comprising:
receiving a message, the content name value to be search being included in the received message, and
forwarding the received message depending on the determined covering relation.

11. The method according to claim 9, wherein the mask type value is a first mask type value, called prefix, or a second mask type value, called postfix, the first mask type value indicating that a masking have to start at the first byte of a content name value, the second mask type value indicating that a masking have to start at the last byte of a content name value.

12. The method according to claim 11, comprising:
determining, as a covering relation, that a content name value of a routing entry is covered by a content name value to be searched, when the content name value to be searched is equal to an abstracted content name value of the routing entry, the abstracted content name value being determined by masking the content name value of the routing entry according to the mask type value of the said routing entry.

13. The method according to claim 12, comprising:
determining, as a covering relation, that a content name value to be searched is equal to a content name value of a routing entry, when the content name value of the routing entry is determined as covered by the content name value to be searched, and the content name value to be searched is determined as covered by the content name value of a routing entry.

14. The method according to claim 11, comprising:
determining, as a covering relation, that a content name value to be searched is covered by a content name value of a routing entry, when the content name value of the routing entry is equal to an abstracted content name value to be searched, the abstracted content name value being determined by masking the content name value to be searched according to the mask type value of the routing entry.

15. A non-transitory computer readable medium comprising a computer program product stored thereon and comprising program instructions, the computer program being loadable into a data-processing unit and adapted to cause the data-processing unit to carry out a method for routing data at a routing device when the computer program is run by the data-processing unit, wherein the method comprises:
accessing a routing table, the routing table comprising a set of entries, each entry comprising:
a content name attribute containing a content name value identifying a content,
a faces attribute containing a faces value identifying a set of devices storing data related to the content name value, and,
a mask type attribute containing a mask type value identifying a type of mask to be used for performing a routing table lookup;
performing a routing table lookup, the routing table lookup comprising an operation of determining a covering relation between the content name value of the said entry and a content name value to be searched, said determining a covering relation comprising abstracting the content name value to be searched according to the entry of the routing table, a length of bytes to be abstracted being equal to the length of the content name value in the entry, a starting byte of the abstracting being determined by the mask type value of the entry; and
updating the routing table depending on the determined covering relation.

* * * * *